United States Patent [19]
Escudero

[11] Patent Number: 5,990,655
[45] Date of Patent: Nov. 23, 1999

[54] METHOD OF OPERATING AN INVERTER FOR POWERING AN INDUCTION MOTOR

[75] Inventor: Jose Escudero, Mostolez, Spain

[73] Assignee: Antonio Merloni S.p.A., Fabriano, Italy

[21] Appl. No.: 08/909,361

[22] Filed: Aug. 11, 1997

Related U.S. Application Data

[63] Continuation of application No. 08/634,909, Apr. 19, 1996, abandoned, which is a continuation of application No. 08/251,696, May 31, 1994, abandoned.

[30] Foreign Application Priority Data

May 31, 1993 [IT] Italy ................................ BO93A0250

[51] Int. Cl.⁶ ........................................................ H02P 7/42
[52] U.S. Cl. .......................................... 318/801; 318/808
[58] Field of Search ...................................... 378/798–815

[56] References Cited

U.S. PATENT DOCUMENTS

| | | | |
|---|---|---|---|
| 4,296,367 | 10/1981 | Hirata | 318/808 |
| 4,327,313 | 4/1982 | Tsuboi et al. | 318/806 X |
| 4,417,193 | 11/1983 | Hirata | 318/803 |
| 4,443,750 | 4/1984 | Altena | 318/808 |
| 4,475,631 | 10/1984 | Nomura | 318/808 X |
| 4,734,634 | 3/1988 | Kito et al. | 318/808 X |
| 4,859,924 | 8/1989 | Chonan | 318/808 |
| 4,879,502 | 11/1989 | Endo et al. | 318/808 X |
| 4,965,504 | 10/1990 | Ueda et al. | 318/808 X |
| 5,272,429 | 12/1993 | Lipo et al. | 318/808 |
| 5,296,791 | 3/1994 | Hipp | 318/808 X |

*Primary Examiner*—Jonathan Salata
*Attorney, Agent, or Firm*—Herbert Dubno

[57] ABSTRACT

An inverter is operated to eliminate hiss in the control of the speed of an induction motor using an inverter of variable frequency. The voltage is matched to the selected frequency to avoid such hiss and control of the voltage is effected by regulating spacing between the pulses outputted by the pilot unit to the gates of the MOSFETs or IGBTs forming the arms of the inverter.

3 Claims, 6 Drawing Sheets

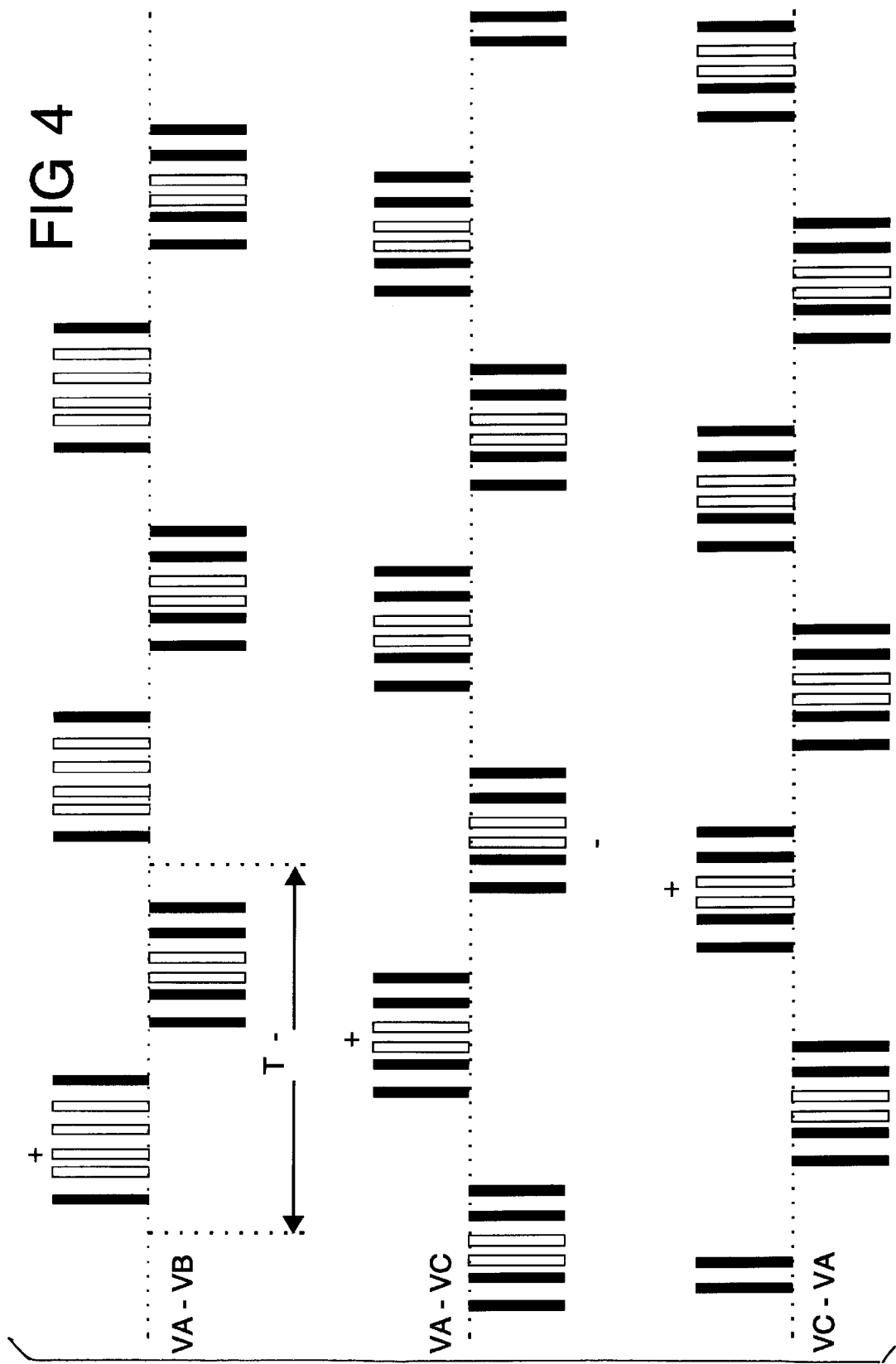

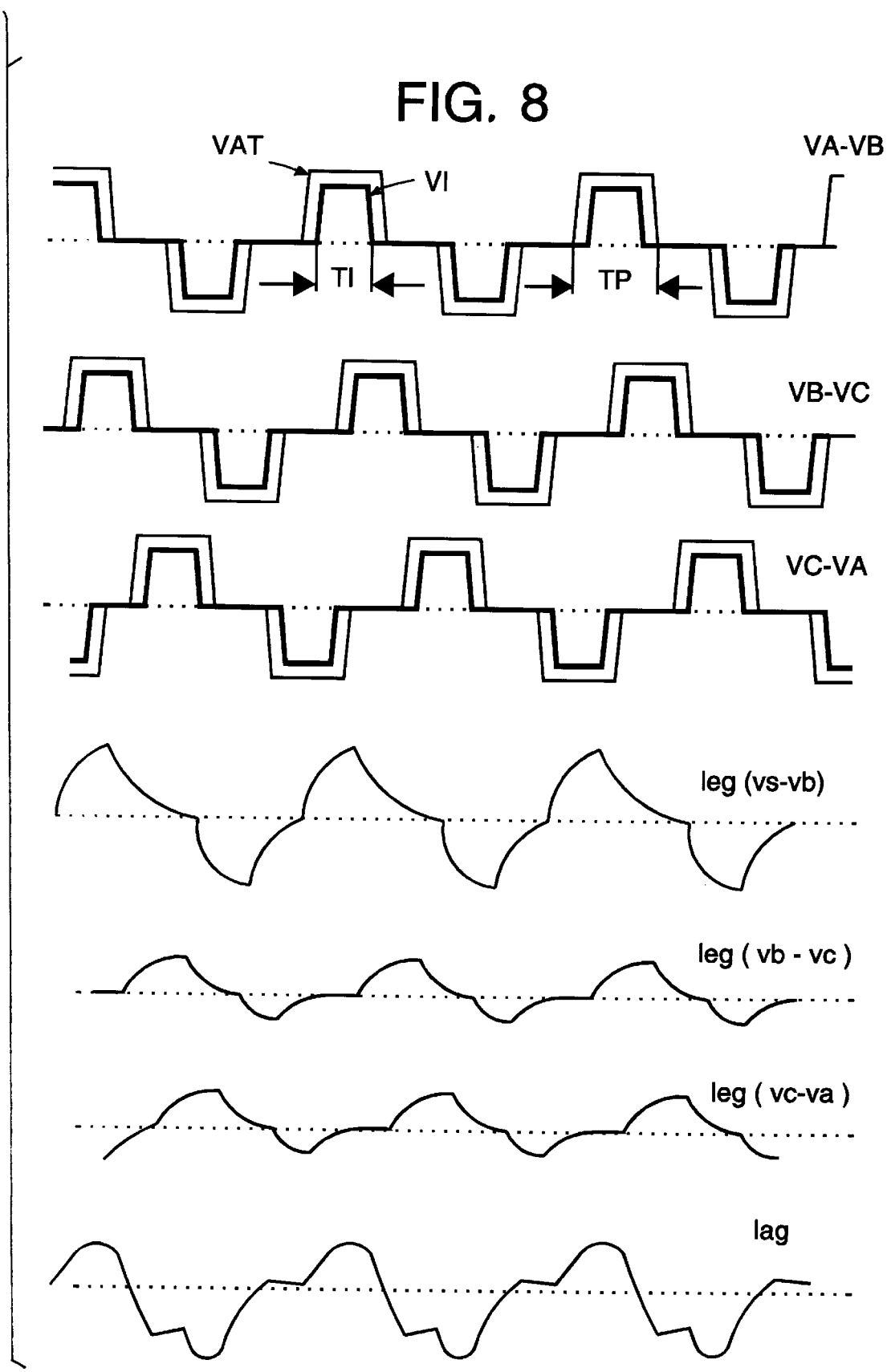

METHOD OF OPERATING AN INVERTER FOR POWERING AN INDUCTION MOTOR

CROSS REFERENCE TO RELATED APPLICATION

This is a file-wrapper continuation of application Ser. No. 08/634,909 filed Apr. 19, 1996, now abandoned, which is a continuation of application Ser. No. 08/251,696 filed May 31, 1994 now abandoned.

FIELD OF THE INVENTION

The present invention relates to a method of operating an inverter for powering an electric induction motor and, more particularly, to a method of driving an induction motor utilizing an electric inverter and frequency control for regulating the motor speed without the hiss usually associated with frequency control of an induction motor.

BACKGROUND OF THE INVENTION

With increasing automation of various processes, speed control of electrical induction motors has become of increasing interest. Asynchronous induction motors can vary in speed only upon variation of the frequency of the electronic power supplied to the motor. The electronic power is derived from the network at a fixed network frequency (usually 50 or 60 Hz) and is converted to a variable frequency alternating current in a so-called "inverter". The inverter generally converts the network alternating current into a direct current and, in turn, the direct current into an alternating current whose frequency can be controlled by controlling the conductivity timing of the power transistors of the inverter.

For an induction motor to be operated correctly, it is known that saturation of the magnetic core should be avoided under all supply conditions, but that the motor should be energized with the maximum magnetic flux short of saturation for optimum mechanical efficiency.

The voltage supplied to the motor cannot be maintained constant while the frequency is varied, but rather must increase approximately linearly with a linear increase in frequency and hence in speed. This relationship is due to the fact that electromotive counterforce (back EMF) generated by the motor which counteracts the applied supply voltage must, by reason of LENZ's Law, increase with the increased frequency. The magnetic flux in the magnetic circuit should be maintained constant. The magnetic flux is proportional to the applied voltage and inversely proportional to the frequency thereof. By varying the frequency, the speed of the rotating field can be regulated and the mechanical speed of the motor determined thereby.

An inverter capable of delivering the alternating supply voltage with variable frequency to an induction motor, comprises generally the aforementioned rectifier stage which can include a condenser or capacitor functioning as a filter for converting the alternating voltage of the supply network to direct current, power transistors which can be of the MOSFET (Metal oxide Semiconductor Field Effect Transistor) or IGBT (Insulated Gate Bipolar Transistor) type in pairs in respective arms connected across the direct current terminals of the rectifier circuit and having outputs tapped between the power transistors of each arm to supply the electric motor.

Diodes can be provided for energy recovery and serve to protect the field effect transistors against reverse current flows and transients, i.e. transient voltage surges. A control circuit can be connected to the gates of the MOSFETs or IGBTs to trigger them in the corresponding sequence to energize the motor with alternating current, the frequency of such energization determining the motor speed. A piloting unit can be provided for responding to the control unit to produce the gate triggering signals for the power transistors and a power supply can be provided for these units, connected across the rectifier output terminals. With the appropriate sequence signals generated by the control unit and conditioned by the piloting unit, the MOSFETs or IGBTs can be rendered conductive in the appropriate sequence to provide a polyphase or monophase energization of the motor.

In the case of a three-phase system, utilizing, for example, a three-phase induction motor whose windings are connected in a delta ($\Delta$) connection, the signals can have square wave configuration with voltages passing between +Vat and −Vat with a phase displacement of 120°. The three-phase inverter can have three arms of the type described and are triggered in 120° out-of-phase relationship but operated at the same cadence or frequency determining the motor speed.

It has been proposed, in this regard, to vary the voltage as a function of the frequency by chopping the piloting signals, thereby resorting to a pulse width modulation of the trigger signals for the power transistors. In pulse width modulation (PWM) the widths of pulses applied to the gates can be varied.

In general, therefore, it can be said that it is possible to obtain various voltages at the outputs of the variable inverter connected to the motor by varying the number, width and intervals of the piloting pulses. The frequency of triggering of the power transistors for motor control purposes is usually between 1 and 16 Hz. Because of the time constant of the motor windings and the operation in a frequency range between 1 and 16 Hz, energization of the motor is within a range ready perceptible to the human ear. This fact and the fact that the magnetostriction phenomena in the magnetic domains of the motor causes the typical hissing which characterizes induction motors whose speeds are controlled by frequency variation.

OBJECTS OF THE INVENTION

It is the principal object of the present invention to suppress hiss in an electronic induction motor whose speed is controlled by frequency variation with an inverter.

Another object of the invention is to provide an improved method of operating a circuit for driving an electronic motor whereby drawbacks of earlier systems are obviated.

Another object of this invention is to provide a method of driving an electric motor through an inverter which can suppress or eliminate the hissing phenomena which have been encountered heretofore when the speed of induction motors was controlled by varying the frequency of the output voltage of an inverter connected to the electric motor.

SUMMARY OF THE INVENTION

These objects and others which will become apparent hereinafter can be achieved, in accordance with the invention by establishing a relationship between the output voltage amplitude and the frequency which is generated by the inverter, selected to prevent the formation of hiss. This is accomplished, according to the invention by applying in each half cycle of each phase a single rectangular pulse of variable amplitude and duration, the peak value and duration being selected so that the magnetic field is an optimum for the motor, giving maximum motor efficiency and without saturation of the inductor formed by the motor.

More particularly, the method of the invention can comprise:
 (a) rectifying in a rectifying network an alternating current of a network frequency to produce a direct current at direct current terminals of the rectifying network;
 (b) connecting across the direct current terminals a plurality of bridge arms each including two power transistors and forming an inverter with the rectifying network, tapping outputs from the inverter from between the power transistors of the arms and connecting the outputs to an induction motor, and triggering the power transistors into conduction in a timed relationship to produce for each half cycle of every supply phase for the motor a rectangular pulse of variable amplitude and duration for a given supply frequency controllable to vary a speed of the motor; and
 (c) controlling an amplitude of the voltage applied at the outputs to the motor in relation to the frequency to be less than the voltage at the terminals and prevent electric induction motor hissing of a type typical of that produced by electric induction motors with speed controlled by frequency variation.

According to the invention, three of the arms are provided in a three-phase inverter network connected across the motor, the motor being a three-phase motor, the voltage from the outputs applied to the motor being varied as a function of variation of the frequency such that a time constant of the motor times three corresponds to a time maximum not in excess of 66% of a period of a cycle of the frequency, an instantaneous sum of maximum values of three currents applied to each winding being equal to a maximum intensity absorbed by the motor when energized by sinusoidal current. The sum of the currents applied to each winding has a generally sinusoidal shape.

The maximum amplitude of the voltage yielding the generally sinusoidal shape is equal to 66% of a supply voltage of the inverter.

According to the invention, a current circulating in the windings of the motor has a waveform of a shape similar to and a practically equal efficiency value as a sinusoidally shaped wave propagated in the windings when a normal triphasal alternating current voltage with a phase displacement of 120° is applied thereto, the waveform having at least one inflection point at which the waveform changes direction.

The inflection point can induce a variation in a magnetic field in the motor at the same frequency as magnetostriction noise producing a silent running of the motor in an absence of high frequency components.

The power transistors are triggered into conduction in a timed relationship to produce for each half cycle of every supply phase for the motor a rectangular pulse of variable amplitude and duration by pulsing the power transistors with respective bundles of pulses of equal pulse width but variable pulse spacing.

Of course, the transistors, which preferably are field effect transistors and, more particularly, are MOSFETs or IGBTs, can be protected by diodes in the manner described.

BRIEF DESCRIPTION OF THE DRAWING

The above and other objects, features, and advantages will become more readily apparent from the following description, reference being made to the accompanying drawing in which:

FIG. 4 is a set of pulse timing diagrams illustrating the use of pulses to control the circuit of FIG. 2;

FIG. 8 is a set of diagrams illustrating the current waves generated within the motor winding in accordance with the application by the inverter of the voltage waves depicted therein.

SPECIFIC DESCRIPTION

Figure 1:
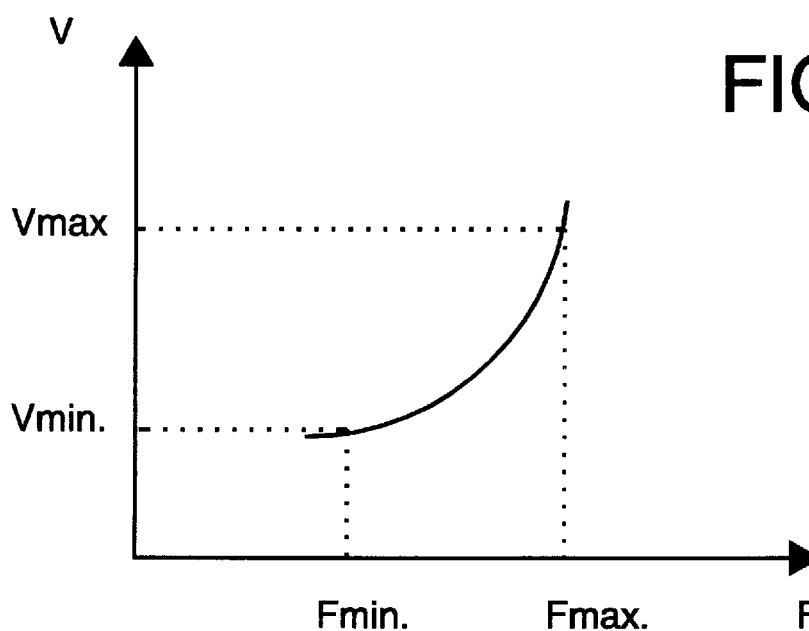
FIG. 1 is a graph representing a relationship between output voltage V and generated frequency F without the formation of hissing.

FIG. 1 shows the relationship between the output voltage V plotted along the ordinate from a value of Vmin to a value Vmax against the generated frequency of the inverter F plotted between values Fmin and Fmax along the abscissa. The graph represents the output voltage and associated frequency which can operate the motor without hissing. The controller 3 to be described hereinafter can be a computer programmed to adjust the output voltage of the inverter to the frequency for any selected frequency utilized to select the operating speed of the motor. In general, the method of the invention applies a single rectangular pulse of variable amplitude and duration for each half cycle of each phase, the pulses being characterized by amplitude Vi and durations Ti, the entire cycle having a period T.

Figure 2:
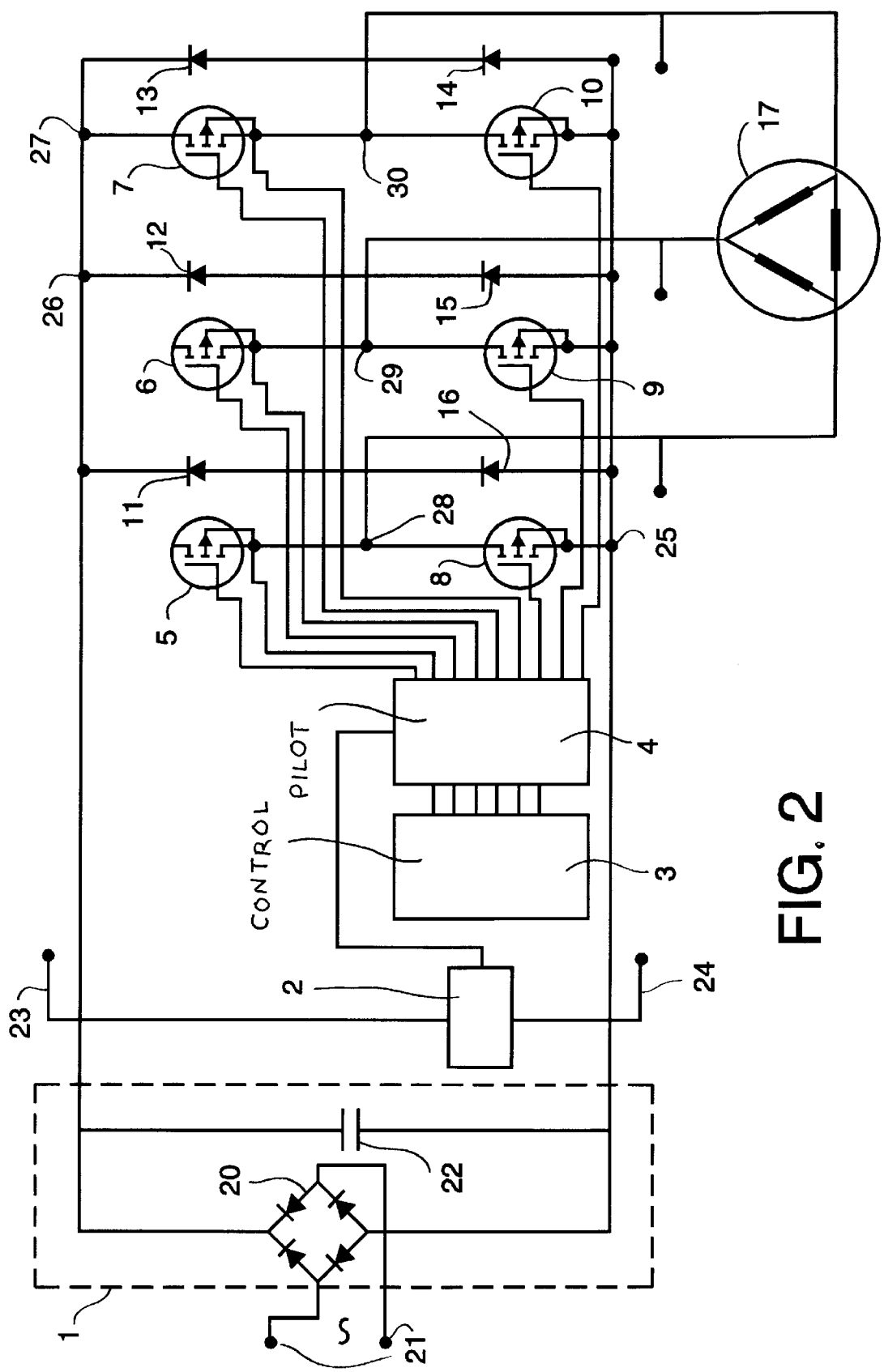
FIG. 2 is a circuit diagram illustrating the inverter connected to a three-phase motor.

Turning to FIG. 2, it will be apparent that the inverter of the present invention can comprise a rectifier bridge 20 having its terminals 21 connected to the alternating current network of 50 or 60 Hz, a filter condenser 22 being bridged across the output of the rectifier 20. The rectifier, condenser unit 1 produces filtered DC at the output terminals 23 and 24 at respective +Vat and −Vat.

Figure 6:
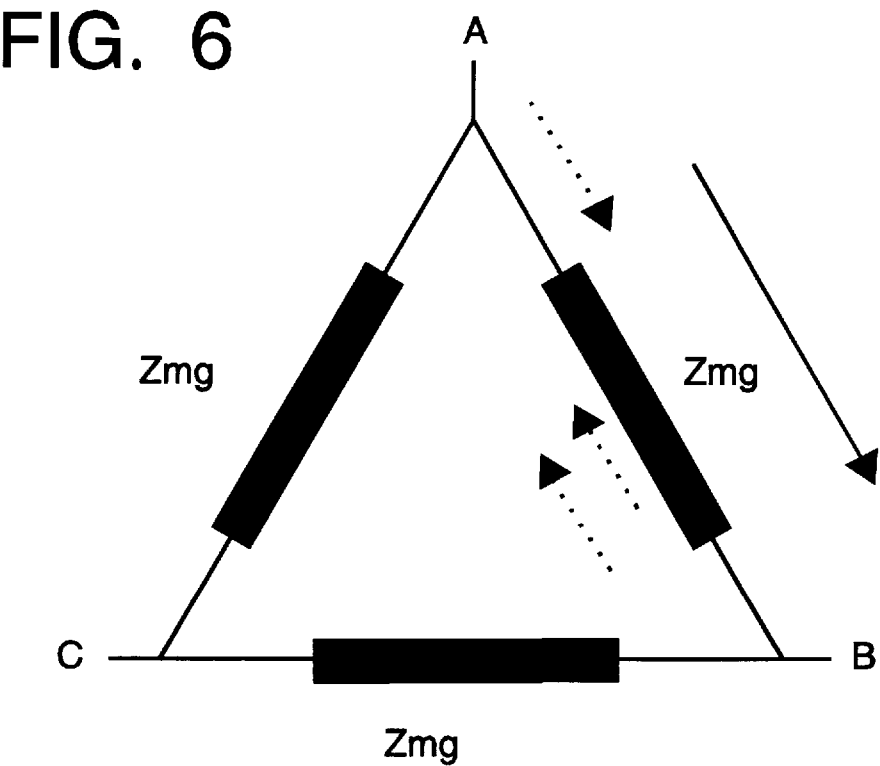
FIG. 6 is a winding connection diagram for a three-phase motor in delta (Δ) configuration.

Bridged across the output terminals 23 and 24 of the rectifier-filter unit 1 are a plurality of arms 25, 26 and 27, three such arms being provided in the case of a three-phase motor 17 which may have its field windings in a delta configuration or triangular configuration as shown (FIG. 6). In the case of a single phase motor, two such arms will be provided.

The inverter of FIG. 2 further comprises a power supply 2 for the control unit 3 and the pilot unit 4 which forms the pulses for triggering the gates of the power transistors.

As is also apparent from FIG. 2, each arm 25, 26, 27 comprises two power transistors, especially MOSFETs or IGBTs. For example, the arm 25 has MOSFETs 5 and 8 with their source-drain networks in series across the DC terminals 23, 24 while the arm 26 has the MOSFETs 6 and 9 with their drain-source terminals in series and the arm 27 has the MOSFETs 7 and 10 with their drain and source terminals in series.

The gates of the MOSFETs 5 to 10 are connected to respective outputs of the pilot unit 4. Bridged across the drain-source network of each MOSFET is a respective energy recovery diode 11, 12, 13, 14, 15 and 16. The terminals 28, 29 and 30, tapped from between the MOSFETs of each arm, form the output terminals of the inverter and are connected via the respective lines A, B, C to the input terminals of the three-phase motor 17.

Figure 3:
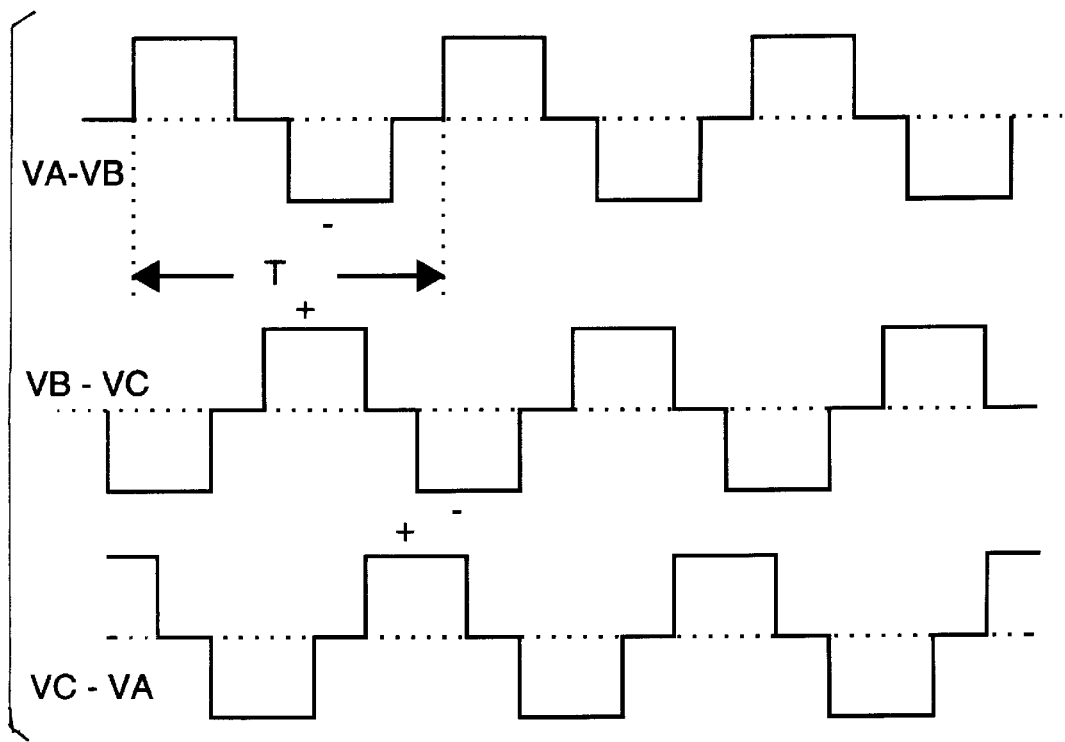
FIG. 3 is a set of waveforms illustrating the operation of the circuit of FIG. 2.

The inverter of FIG. 2 operates as a three-phase inverter to output the waveforms of FIG. 3. The upper waveform diagram of FIG. 3 shows the output across lines A and B as VA-VB, while the middle diagram shows the voltage across lines B and C as voltage VA-VC, while the lower waveform diagrams shows the voltage between lines A and C, namely VC-VA. In each case, during the respective half cycle, the voltage +Vat or −Vat will be applied in each single cycle for the respective square wave duration. The waveforms are offset from one another by 120° C. By varying the cycle period T and the frequency of these voltages, the rotational speed of the motor is varied. In prior art configurations, the delivered voltage remains the same for the entire range of frequency and speed variation whereas the voltage level is controlled for frequency of the present invention utilizing the curve of FIG. 1.

Figure 5:
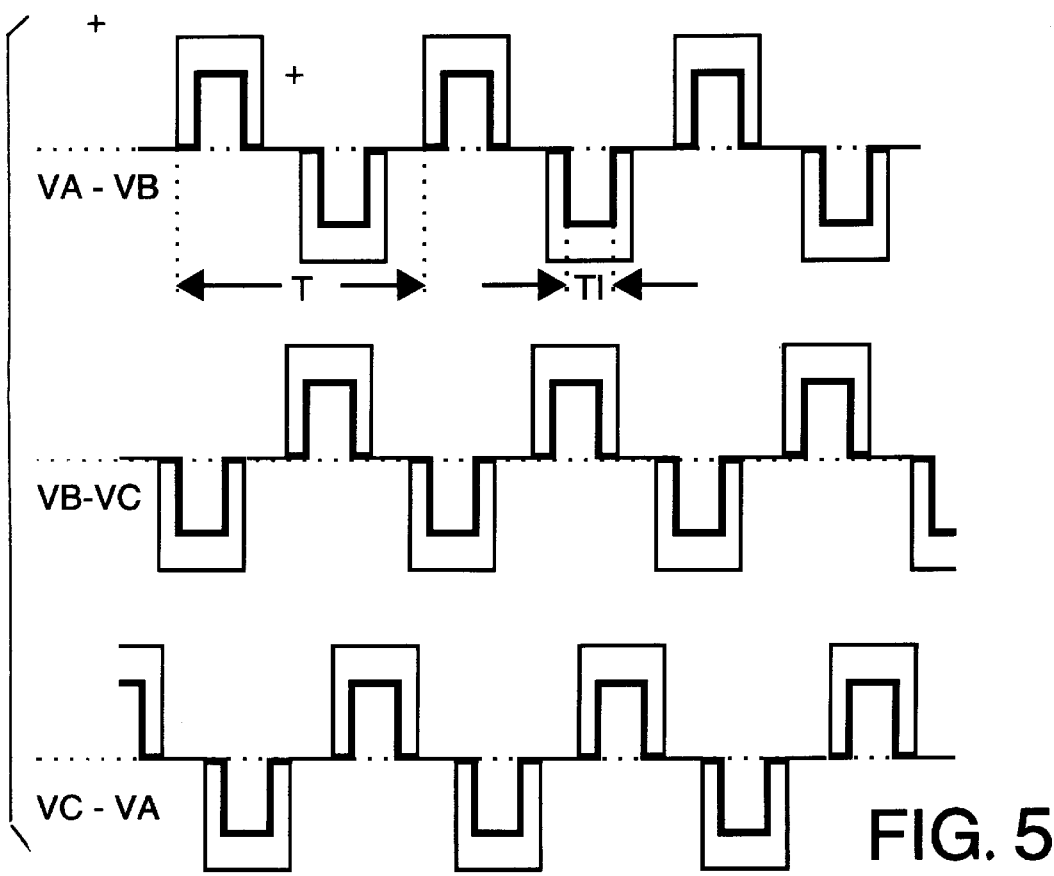
FIG. 5 is a set of diagrams in the various phases showing the voltages applied to the motor.

According to the invention, therefore, the voltages of the square wave pulses are controlled and are always less than maximum as FIGS. 5 and 8 will show.

More particularly, in order to obtain the relationship between the output voltage and the generated frequency illustrated in FIG. 1 without producing the aforedescribed hissing, the method of the invention applies for each half cycle of every phase a rectangular pulse of variable amplitude and duration as has been indicated in FIG. 5.

In this FIG., the thin lines indicated the voltage pulses of a conventional triphase inverter operating with a frequency of period T (see also FIG. 3), while the thick line indicates the output voltages of the inverter when the method of the invention is applied. The parameters which characterize the pulse are at amplitude Vi and the duration Ti.

By combining the peak value Pi with the pulse duration Ti, the magnetic field of the motor can operate at the optimum level of magnetization from the point of view of the motor efficiency at the frequency corresponding to the period T. The pulse duration Ti and the amplitude Vi should yield a net current flow with a waveshape as close as possible to a sinusoidal shape as will be described in connection with FIG. 9, the proximity to sinusoidal being optimum for the motor.

FIG. 6 shows the electrical diagram of the windings of a common 3-phase motor while field windings are connected in a delta configuration or a triangle. The voltages generated by the inertia are applied to terminals A, B, C of the motor. Each phase will have an impedance Zmg and is traversed by a current Img(tot) which results from the superimposition of the currents Img(Va-VB), Img (VB-VC) and Img(VC-VA) generated by application to the terminals A, B, C, the voltages VA-VB, VB-VC and VC-VA across them respectively. The current flow is represented by the vector in FIG. 6 parallel to the phase A-B.

Figure 7:
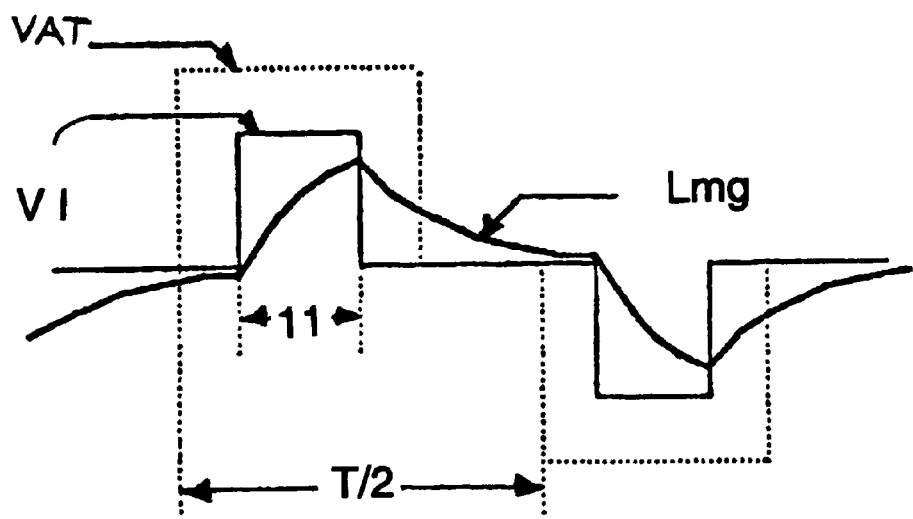
FIG. 7 is a diagram showing the current in one phase resulting from the applied voltages.

The impedance Zmg=Rmg+i Lmg, has a resistive part Rmg proportional to the losses in the magnetic circuit and the resistive losses of the windings and the mechanical resistance of the motor shaft. It also has an imaginary (complex) or inductive part determined by the inductance Lmg which is proportional to the magnetic flux and thus to the magnetic field and the dispensed fluxes of the stator and the rotor. The currents which flow in the windings have been represented in FIG. 8 and are the result of the application of the voltages shown in heavy lines in the top III waveform of FIG. 8 across the motor terminals as indicated. The current flow during each part of the application of the voltage is of the exponential type and has been shown for one phase in FIG. 7. This has a time constant=Lmg/Rmg. If the pulse duration Ti is less than or equal to the time constant=Lmg/Rmg and if the amplitude Vi of the pulse is such that the instantaneous sum of maximum values of the three currents present in each winding:

$$Img(Va - Vb)_{max} = Vi/Rmg$$

$$Img(Vb - Vc)_{max} = 0.5 * Vi/Rmg$$

$$Img(Vc - Va)_{max} = 0.5 * Vi/Rmg$$

and these three currents correspond to the maximum intensity absorbed by the motor, at the nominal potential supplied with sinusoidal current, the resulting current Img(tot) in each winding will correspond to the showing for the bottom three waveforms of FIG. 8.

The waveform shown in FIG. 8 is based upon the following three parameters:

A time constant=Lmg/Rmg multiplied by three and corresponding to a time Ti whose maximum is 66% of the period T of the frequency which is generated;

The maximal intensity equivalent to the sinusoidal wave is obtained for a value Vi equal to 66% of the inverter supply voltage Vat; and The values (VA-VB), (VB-VC), (VC-VA), Img(VA-VB), Img(VB-VC) and Img(VC-VA) and Img(tot) correspond to the values calculated by computer.

Figure 9:
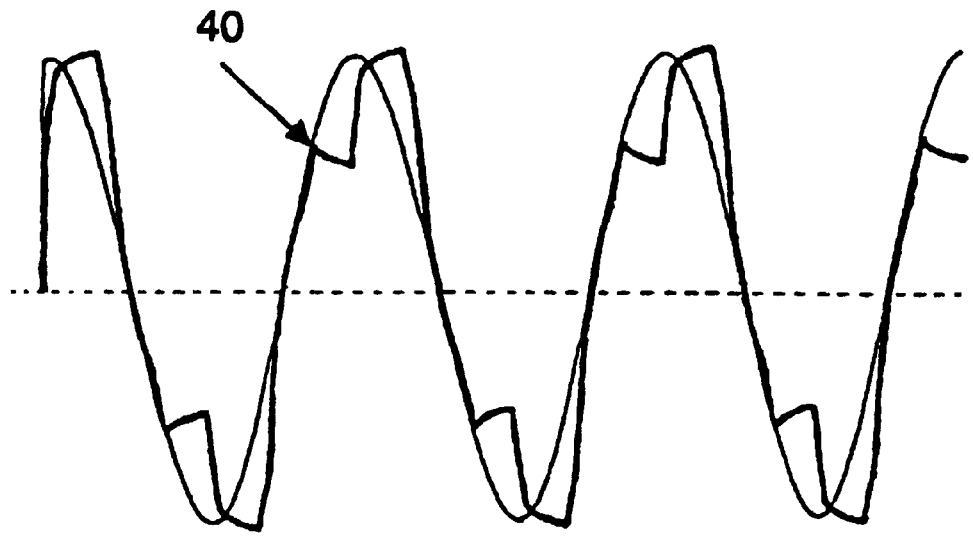
FIG. 9 is an illustration to a larger scale of the current in the windings of a motor showing inflection regions as can arise with the present invention.

The waveform diagram of FIG. 9 shows on a larger scale the current Img(tot) which circulates within the windings of the motor according to the method of the invention. In this FIG. the thin lines show the shape of the sinusoidal current wave which occurs in these windings when normal three phase voltage with a three phase displacement of 120° is applied. The heavier lines show the superimposition in each phase of the current flows of FIG. 8.

The two wave shapes shown in FIG. 9 are very similar and the efficiency values of both are practically identical. The only difference of significance in the flow of current obtained with the method of the invention is the presence of an inflection point or region 40 at which the current changes sign or direction and is indicated by an arrow.

The variation in the magnetic field due to this change of direction and the corresponding noise due to magnetostriction occurs at the same frequency of the motor and will have the same noise tone as is produced by motors supplied with normal electric network signals. The invention therefore, eliminates higher frequency components to insure silent operation. The invention, therefore, can reduce or eliminate hiss in induction motors controlled by frequency variation with an electronic inverter.

From FIG. 4, it will be apparent that in the pilot unit, pulses are generated which trigger the gates of the MOS-FETs for the requisite durations. The modulation is by controlling the spacing between the pulses which are of equal width and common amplitude.

I claim:

1. A chopper-free method of driving an electric motor, comprising the steps of:

(a) rectifying in a rectifying network an alternating current of a network frequency to produce a direct current at direct current terminals of said rectifying network;

(b) connecting across said direct current terminals three bridge arms each including two MOSFET or IGBT power transistors with source-drain terminals bridged by respective diodes and forming an inverter with said rectifying network, tapping outputs from said inverter from between the power transistors of said arms and connecting said outputs to terminals of a three-phase delta-connected induction motor, and triggering said power transistors into conduction by generating voltage pulses at a frequency controllable to vary a speed of said motor, and with each of said voltage pulses generating a group of pilot pulses of constant amplitude and variable timing across gate-source terminals of power transistors in a timed relationship to produce for each half cycle of every supply phase for said motor a rectangular pulse of variable amplitude and variable duration for said supply frequency in the respective motor windings to vary said speed of said motor; and (c) controlling an amplitude of the rectangular pulse applied at said outputs to said motor in relation to said frequency to be less than the voltage at said terminals and prevent electric induction motor hissing of a type typical of that produced by electric induction motors with speed controlled by frequency variation and in accordance with a curve of voltage plotted against frequency between maximum and minimum values of frequency and voltage at which the motor will operate without hissing, said voltage from said outputs applied to said motor as said rectangular pulses is varied as a function of variation of said frequency such that a time constant of said motor times three corresponds to a time maximum not in excess of 66% of a period of a cycle of the said frequency, an instantaneous sum of maximum values of three currents applied to each winding being equal to a maximum intensity absorbed by said motor when energized by sinusoidal current, and the sum of the currents applied to each winding has a generally sinusoidal shape, a current circulating in the windings of the motor has a waveform of a shape similar to and a practically equal efficiency value as a sinusoidally shaped wave propagated in said windings when a normal triphasal alternating current voltage with a phase displacement of 120° is applied thereto, said waveform having at least one inflection point at which the waveform changes direction.

2. The method defined in claim 1 wherein the maximum amplitude of the voltage yielding said generally sinusoidal shape is equal to 66% of a supply voltage of the inverter.

3. The method defined in claim 1 wherein said inflection point induces a variation in a magnetic field in said motor at the same frequency as magnetostriction noise producing a silent running of the motor in an absence of high frequency components.

* * * * *